United States Patent [19]
Gerlach

[11] Patent Number: 5,044,920
[45] Date of Patent: Sep. 3, 1991

[54] HEAT TREATMENT APPARATUS FOR CONTINUOUSLY ADVANCED MATERIAL

[76] Inventor: Jürgen Gerlach, In den Gärten 30, D-5140 Erkelenz, Fed. Rep. of Germany

[21] Appl. No.: 386,987

[22] Filed: Jul. 28, 1989

[30] Foreign Application Priority Data

Aug. 4, 1988 [DE] Fed. Rep. of Germany ....... 3826523

[51] Int. Cl.⁵ ............... B29C 35/02; B65G 17/24; F27D 3/12
[52] U.S. Cl. .................. 425/445; 198/779; 432/121; 425/DIG. 108
[58] Field of Search ............ 425/34.2, 34.3, 467, 425/28.1, DIG. 108, 403.1, 445, 404; 198/779, 792, 784; 432/121

[56] References Cited

U.S. PATENT DOCUMENTS

| | | | |
|---|---|---|---|
| 385,251 | 6/1888 | Daniels | 198/779 |
| 2,697,509 | 12/1954 | Cushman | 198/779 |
| 2,777,566 | 1/1957 | King | 198/779 |
| 2,829,762 | 4/1958 | Oswald | 198/779 |
| 3,406,810 | 10/1968 | Blair et al. | 198/779 |
| 4,764,102 | 8/1988 | Takahashi | 425/467 |

FOREIGN PATENT DOCUMENTS

| | | | |
|---|---|---|---|
| 254046 | 10/1962 | Australia | 198/779 |
| 1172833 | 6/1964 | Fed. Rep. of Germany | 198/779 |
| 2426478 | 12/1974 | Fed. Rep. of Germany | 198/779 |
| 2405030 | 8/1975 | Fed. Rep. of Germany | 198/779 |
| 35890 | 1/1967 | Finland | 198/779 |
| 224831 | 7/1985 | German Democratic Rep. | 198/779 |
| 59-163212 | 9/1984 | Japan | 198/779 |

*Primary Examiner*—Jay H. Woo
*Assistant Examiner*—James P. Mackey
*Attorney, Agent, or Firm*—Merchant, Gould, Smith, Edell, Welter & Schmidt

[57] ABSTRACT

Known heat treatment apparatus for continuously advanced material, for example for extruded strip to be vulcanized, include an endless transporting element which is in the form of a belt of steel or of coated glass fiber fabric according to the thermal load. Such conveyor belts have an adverse influence on the engaging surface of the extruded strip and cause surfae defects. The invention aims to achieve a largely defect-free end product and it includes a transporting element in which a plurality of rotatably mounted cylindrical rollers are arranged one behind the other between two mutually parallel chains, each roller being rotated by friction forces on at least one stationary strip as the roller is carried along by the chains.

15 Claims, 1 Drawing Sheet

HEAT TREATMENT APPARATUS FOR CONTINUOUSLY ADVANCED MATERIAL

FIELD OF THE INVENTION

The invention relates to heat treating apparatus for continuously advanced material, comprising a heating channel and means arranged in it for transporting the material, for example extruded strip to be vulcanised, the means comprising a driven endless transporting element.

DESCRIPTION OF RELATED ART

Extruded strips generally have to be subjected to subsequent treatment, for example rubber sections for vulcanising are conducted through a heating channel, an endless belt being employed for transporting them.

Conveyor belts are manufactured of a wide range of materials according to the temperatures they need to be able to withstand. If the vulcanising process has to be performed at particularly high temperatures steel belts are employed, but they are very difficult to guide. Also a rubber section tends to adhere to this steel belt if it is heated above 180° C. and furthermore there is no possibility of allowing for the thermal extension of the rubber.

Accordingly, especially to overcome the adhesion effect, glass fibre belts coated with polytetrafluoroethylene have been employed in preference to steel. From the point of view of guiding through a heating installation they have substantial advantages over steel belts. However, the temperature is limited to about 260° C. where such coated glass fibre belts are employed. Moreover, at such high temperatures a rough texture develops very rapidly on the surface of the belt. This pattern on the conveyor belt is imparted to the engaging surface of the rubber strip, which initially, as is known, becomes relatively soft and tacky on heating. The quality of the end product is reduced by such surface defects. Furthermore, where glass fibre belts are employed the rubber section is very poorly heated through its engaging face as the thermal conduction from the belt to the engaging face is insufficient because of the low thermal conductivity. The slight infra-red radiation effect that is present cannot make up for this.

Accordingly it is the object of the invention to provide thermal treatment apparatus of the kind stated in the introduction which achieves optimum heat penetration of the material also on its engaging face and at very high temperatures, whilst at the same time the surface structure of the engaging face of the material being carried is not adversely affected.

SUMMARY OF THE INVENTION

According to the invention this problem is solved by heat treatment apparatus in which the transporting element comprises two mutually parallel chains, between which is arranged a plurality of rotatably mounted cylindrical rollers one behind another, each roller being capable of rolling on at least one stationary strip forming a friction support. Advantageous further features are revealed by the subsidiary claims.

The transporting element performs a linear movement through the heating channel. However, as the cylindrical rollers roll on the stationary friction support they perform a rotary movement which is superimposed on the linear movement. Thus on the one hand a relatively high transporting velocity of the extruded strip is achieved with only a low driving speed and on the other hand, the rotary movement of the rollers achieves the result that the extruded strip can adhere to the rollers scarcely or not at all. The strip is therefore conducted through the heating channel without intimate contact with the transporting element, and so no defects are impressed on its engaging surface.

According to a preferred embodiment the successive cylindrical rollers are spaced apart from one another. In this way there is room for ventilation of the engaging surfaces from below and any plasticiser vapours which may possibly emerge from the extruded strip can easily be carried away.

Each chain is suspended on a respective end face of each cylindrical roller. Further, each chain is of endless form.

It has been found advantageous to make each cylindrical roller of conical shape at each end. Each strip has, on its surface which forms the friction support, an inclination matching this conical taper. The strips are arranged to be stationary in the channel in such a way that the conically shaped ends of the cylindrical rollers can roll on them. In this connection it has been found particularly advantageous to arrange each strip to be displaceable in a direction parallel to the axes of the rollers. By such displacement the speed of rotation of a roller can be adjusted as this depends on the effective circumference on which the roller rolls.

This has the advantage that one can set a linearly rising speed profile over the whole length of treatment. In this way thermal expansion of the strip, such as arises in particular in foam rubber extrusions, can be allowed for.

The transporting element is driven through a double pinion which engages in the two chains. Accordingly there will be no lateral drift of the conveyor belt.

Furthermore it is of advantage to provide a direction-changing roller as a tension device so that the thermal expansion of the transporting element can be taken up. It is advantageously made of metal, but it could also be made of a ceramic oxide.

It has been found to be of advantage to use as the material for the cylindrical rollers one of high thermal capacity. Thus at the direction-changing locations of the endless transporting element one has to allow for only minimal heat losses or changes in temperature. In this way once they have been heated the cylindrical rollers largely maintain their high temperature, so that they ensure a strong infra-red content in the radiation. This has an additional favourable influence on the heating of the extruded strip at its engaging surface. The rollers are preferably made of metal or a ceramic oxide and have a smooth surface which can for example be achieved by polishing or by the application of a glaze.

The invention is further described in the drawing in conjunction with an embodiment only by way of example.

DESCRIPTION OF THE PREFERRED EMBODIMENT

Figure 1:
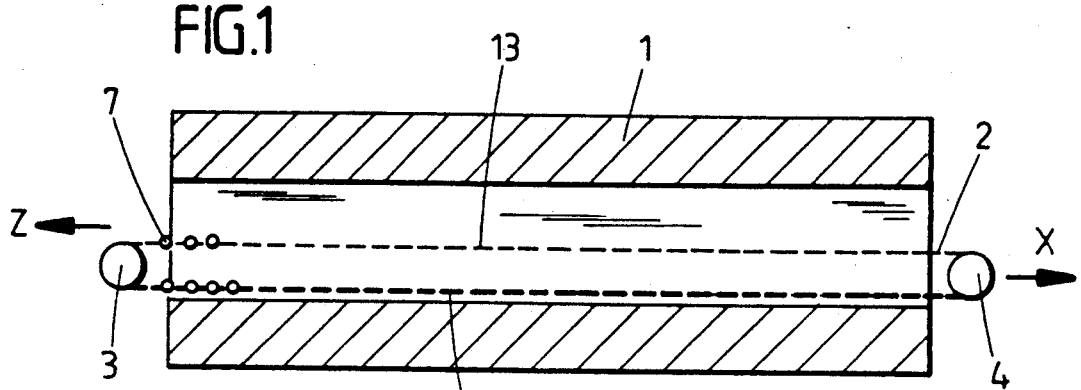
FIG. 1 is a longitudinal section through heat treatment apparatus according to the present invention.

FIG. 1 shows diagrammatically a longitudinal section through heat treatment apparatus according to the present invention. A transporting element 2 is mounted in a heating channel 1. The transporting element 2 is driven by a double pinion 3 formed as a direction-changing roller, the drive being such that the upper run 13 moves in the direction of the arrow Z. A further direction-changing roller 4 is provided and can be adjusted in the direction of the arrow X in order to take up any thermal expansion of the transporting element 2 which may arise. The transporting element 2 comprises a plurality of cylindrical rollers 7 of which only a few are illustrated here. The cylindrical rollers of the lower run 14 can run on the floor of the heating channel 1. This ensures that the transporting element is relieved of unnecessary load.

Figure 2:
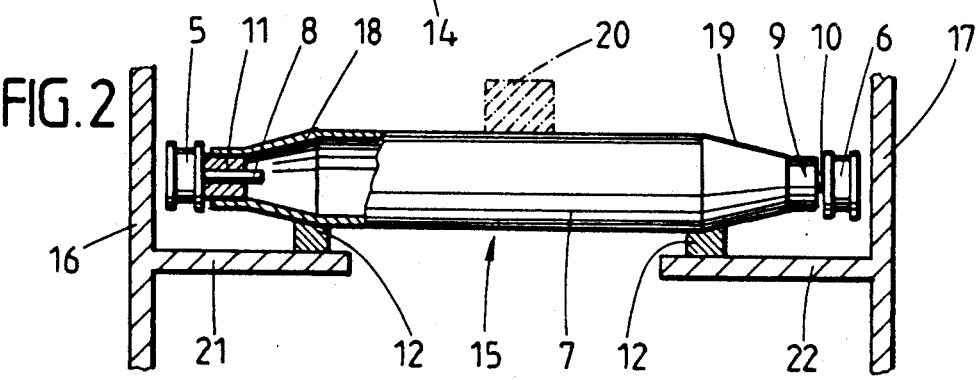
FIG. 2 is a section through the region containing the upper run of the transporting element.

FIG. 2 shows in cross-section that region of the heat treatment apparatus containing the upper run of the transporting element. In the region of the side walls 16, 17 of the heat treatment apparatus there are guided two chains 5, 6 which are suspended on the ends of the rollers 7. Overhung pins 8, 9 are provided for this purpose and are guided by bearing bushes 10, 11 in the end faces of the rollers. Preferably high-temperature resistant and maintenance-free journal bearings are used as the bearing bushes 10, 11. Each roller 7 is shaped conically at its two ends. The conically formed ends 18, 19 are in contact with a pair of stationary strips 12 of which the surfaces each have an inclination matching the conical ends 18, 19. These strips 12 are displaceably mounted on projections 21, 22 extending into the interior of the heating channel from its side walls 16, 17. In this way the effective circumference of the rollers 7, by which the speed of rotation of the rollers 7 is determined, can be varied. The further out the strips 12 are displaced, the greater is the speed of rotation of the rollers 7. According to how the strips 12 are arranged at each point in the channel 1, a desired speed profile can be set for the rollers which move over them. In many cases it is appropriate for the speed of the extruded strip 20 to increase linearly in the direction of travel.

Figure 3:
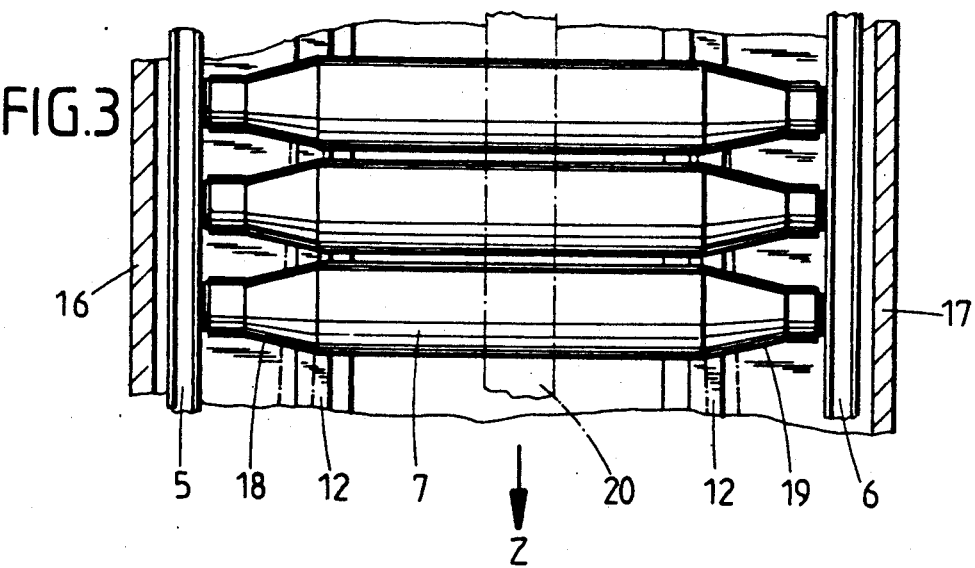
FIG. 3 is a plan view of the upper run.

In FIG. 3 it is illustrated in plan view how several rollers 7 are arranged one behind the other. They are arranged spaced apart from one another between the chains 5, 6 which run in the region of the side walls 16, 17, so that a small gap is present between each adjacent pair of rollers 7, through which the extruded strip 20 is ventilated from its engaging face, and by means of which any plasticiser vapour which arises can escape. The strips 12 are arranged so that they are aligned with those portions of the conically shaped ends 18, 19 at which the diameter and thereby the circumference, is a maximum. In this position, the strips 12 cause the rollers 7 to rotate at such a speed that the velocity of transport of the extruded strip 20 in the direction of arrow Z is twice the speed of the transporting element 2. As the strips 12 are displaced outward from the center of the channel (as shown in phantom lines in FIG. 3), they contact a narrower portion of each conically shaped end 18, 19, and cause the rollers 7 to rotate faster and further increase the velocity of transport of the extruded strip 20 in the direction of the arrow Z.

Figure 4:
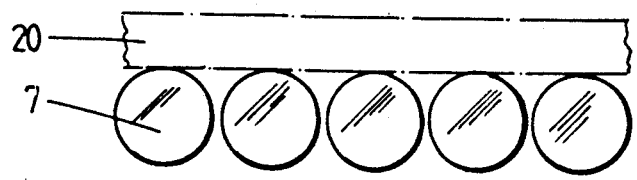
FIG. 4 is a diagrammatic side view of the upper run with the extruded strip resting on it.

FIG. 4 shows a diagrammatic side view of the upper run, showing how the extruded strip 20 lies in relation to the cylindrical rollers 7. It can be seen that the extruded strip 20 only has minimum contact surface with the transporting element in the form of the rollers 7. The direction of the arrow Y shows how vapours and the like can escape.

The use of cylindrical rollers guided over chains as the endless transporting element has the advantage over the conventional flexible conveyor belts of being substantially more durable as wear-inducing loads, in particular at the direction-changing points, no longer arise.

What is claimed is:

1. Heat treatment apparatus for continuously advanced material, said apparatus comprising a heating channel having an entrance and an exit; and transporting means arranged within said channel for transporting said material, said transporting means including a driven endless transporting element comprising two mutually parallel chains and a plurality of cylindrical rollers, located one behind another between said chains, with ends of said rollers being rotatably mounted to said chains, each said roller having at least one conically shaped end, through which each said roller is selectively in rolling contact with at least one stationary strip positioned in said channel to form a friction support, wherein said strip is positioned in an oblique orientation relative to said parallel chains, such that said strip contacts a relatively large circumferential portion of said conically shaped end of each said roller near the entrance of said channel, and said strip contacts a relatively small circumferential portion of said conically shaped end of each said roller near the exit of said channel, whereby each said roller rotates at increaseingly high speeds as each said roller proceeds from the entrance of said channel to the exit of said channel by movement of said parallel chains.

2. The apparatus set forth in claim 1 wherein said cylindrical rollers are arranged spaced apart from one another.

3. The apparatus according to claim 1 wherein each said chain is suspended on a respective end of each said cylindrical roller.

4. The apparatus set forth in claim 1 wherein each chain is of endless form.

5. The apparatus set forth in claim 1, wherein said rollers are substantially parallel, and said at least one stationary strip is displaceable in the direction of the axes of said rollers.

6. The apparatus set forth in claim 1 including driving means for said transporting element, said driving means comprising a double pinion.

7. The apparatus set forth in claim 6 wherein said double pinion is in the form of a direction-changing roller.

8. The apparatus set forth in claim 1 further including a direction-changing roller over which said transporting element passes, said direction-changing roller forming a tensioning device to compensate for thermal expansion.

9. The apparatus set forth in claim 1 wherein at least one of said cylindrical rollers is made of metal.

10. The apparatus set forth in claim 1 wherein at least one of said cylindrical rollers is made of a ceramic oxide.

11. The apparatus set forth in claim 1 wherein each said roller has a transporting surface that is smooth.

12. The apparatus according to claim 2 wherein each said chain is suspended on a respective end of each said cylindrical roller.

13. The apparatus set forth in claim 9 wherein each said roller has a transporting surface that is smooth.

14. The apparatus set forth in claim 10 wherein each said roller has a transporting surface that is smooth.

15. The apparatus according to claim 1, further comprising means for vulcanizing a strip-shaped extrudate.

* * * * *